United States Patent
Shirai (10) Patent No.: US 12,249,947 B2
(45) Date of Patent: Mar. 11, 2025

(54) MOTOR CONTROL DEVICE AND ELECTRIC PUMP DEVICE

(71) Applicant: NIDEC POWERTRAIN SYSTEMS CORPORATION, Kanagawa (JP)

(72) Inventor: Yasuhiro Shirai, Kanagawa (JP)

(73) Assignee: NIDEC POWERTRAIN SYSTEMS CORPORATION, Kanagawa (JP)

( * ) Notice: Subject to any disclaimer, the term of this patent is extended or adjusted under 35 U.S.C. 154(b) by 142 days.

(21) Appl. No.: 18/340,889

(22) Filed: Jun. 26, 2023

(65) Prior Publication Data

US 2024/0007030 A1    Jan. 4, 2024

(30) Foreign Application Priority Data

Jun. 30, 2022 (JP) ................................ 2022-106233

(51) Int. Cl.
   *H02P 6/00*   (2016.01)
   *H02P 6/16*   (2016.01)
   *H02P 6/182*  (2016.01)

(52) U.S. Cl.
   CPC .................. *H02P 6/182* (2013.01)

(58) Field of Classification Search
   CPC .................................................. H02P 6/182
   USPC .................................................. 318/400.35
   See application file for complete search history.

(56) References Cited

U.S. PATENT DOCUMENTS

| | | | |
|---|---|---|---|
| 2008/0252242 A1* | 10/2008 | Akama | H02P 6/12 318/400.14 |
| 2010/0295490 A1 | 11/2010 | Kuroshima et al. | |
| 2014/0070769 A1* | 3/2014 | Harada | B60L 50/16 320/109 |
| 2017/0155346 A1* | 6/2017 | Kaidu | H02P 6/182 |

* cited by examiner

*Primary Examiner* — Erick D Glass
(74) *Attorney, Agent, or Firm* — HAUPTMAN HAM, LLP (57) ABSTRACT

One aspect of a motor control device of the present invention is a motor control device that controls a three-phase motor, the motor control device including a drive circuit that converts DC power supply voltage into three-phase AC voltage and supplies the three-phase AC voltage to the three-phase motor, a voltage detection unit that detects terminal voltage of three phases of the three-phase motor, and a control unit that detects a point at which induced voltage appearing in each terminal voltage of the three phases intersects a predetermined zero-cross determination level as a zero-cross point, and controls the drive circuit based on a detection result of the zero-cross point. The control unit changes a value of the zero-cross determination level when the induced voltage of at least one of the three phases increases and when the induced voltage of at least one of the three phases decreases.

5 Claims, 6 Drawing Sheets

| ENERGIZATION PATTERN | | | | | | | PHASE PATTERN | | | |
|---|---|---|---|---|---|---|---|---|---|---|
| No. | Q$_{UH}$ | Q$_{VH}$ | Q$_{WH}$ | Q$_{UL}$ | Q$_{VL}$ | Q$_{WL}$ | No. | H$_U$ | H$_V$ | H$_W$ |
| PA1 | 1 | 0 | 0 | 0 | 0 | 1 | PB1 | 1 | 1 | 0 |
| PA2 | 1 | 0 | 0 | 0 | 1 | 0 | PB2 | 1 | 0 | 0 |
| PA3 | 0 | 0 | 1 | 0 | 1 | 0 | PB3 | 1 | 0 | 1 |
| PA4 | 0 | 0 | 1 | 1 | 0 | 0 | PB4 | 0 | 0 | 1 |
| PA5 | 0 | 1 | 0 | 1 | 0 | 0 | PB5 | 0 | 1 | 1 |
| PA6 | 0 | 1 | 0 | 0 | 0 | 1 | PB6 | 0 | 1 | 0 |

MOTOR CONTROL DEVICE AND ELECTRIC PUMP DEVICE

CROSS-REFERENCE TO RELATED APPLICATIONS

The present invention claims priority under 35 U.S.C. § 119 to Japanese Patent Application No. 2022-106233 filed on Jun. 30, 2022, the entire content of which is incorporated herein by reference.

FIELD OF THE INVENTION

The present invention relates to a motor control device and an electric pump device.

BACKGROUND

As a control method of a sensorless motor, sensorless control, in which a point at which induced voltage appearing in each three-phase terminal voltage of a motor intersects neutral point potential is detected as a zero-cross point, and energization control of the motor is performed based on a detection result of the zero-cross point, is known. Conventionally, a technique for stably driving a sensorless motor in a low rotation range is known.

There has been a possibility that, in a case where a sensorless motor is controlled at a rotation speed close to a limit minimum rotation speed required to generate induced voltage by which a zero-cross point can be detected under a low temperature environment, a detection timing of a zero-cross point deviates from an ideal timing due to distortion of a waveform of induced voltage, and as a result, it is difficult to stably perform sensorless control of a motor. The above conventional technique cannot solve such a technical problem.

SUMMARY

One aspect of an exemplary motor control device of the present invention is a motor control device that controls a three-phase motor, the motor control device including a drive circuit that converts DC power supply voltage into three-phase AC voltage and supplies the three-phase AC voltage to the three-phase motor, a voltage detection unit that detects terminal voltage of three phases of the three-phase motor, and a control unit that detects a point at which induced voltage appearing in each terminal voltage of the three phases intersects a predetermined zero-cross determination level as a zero-cross point, and controls the drive circuit based on a detection result of the zero-cross point. The control unit changes a value of the zero-cross determination level when the induced voltage of at least one of the three phases increases and when the induced voltage of at least one of the three phases decreases.

One aspect of an exemplary electric pump device of the present invention includes a three-phase motor having a shaft, a pump located on a first side in an axial direction of the shaft and driven by the three-phase motor via the shaft, and the motor control device of the above aspect that controls the three-phase motor.

The above and other elements, features, steps, characteristics and advantages of the present disclosure will become more apparent from the following detailed description of the preferred embodiments with reference to the attached drawings.

DETAILED DESCRIPTION

Hereinafter, an embodiment of the present invention will be described in detail with reference to the drawings.

Figure 1:
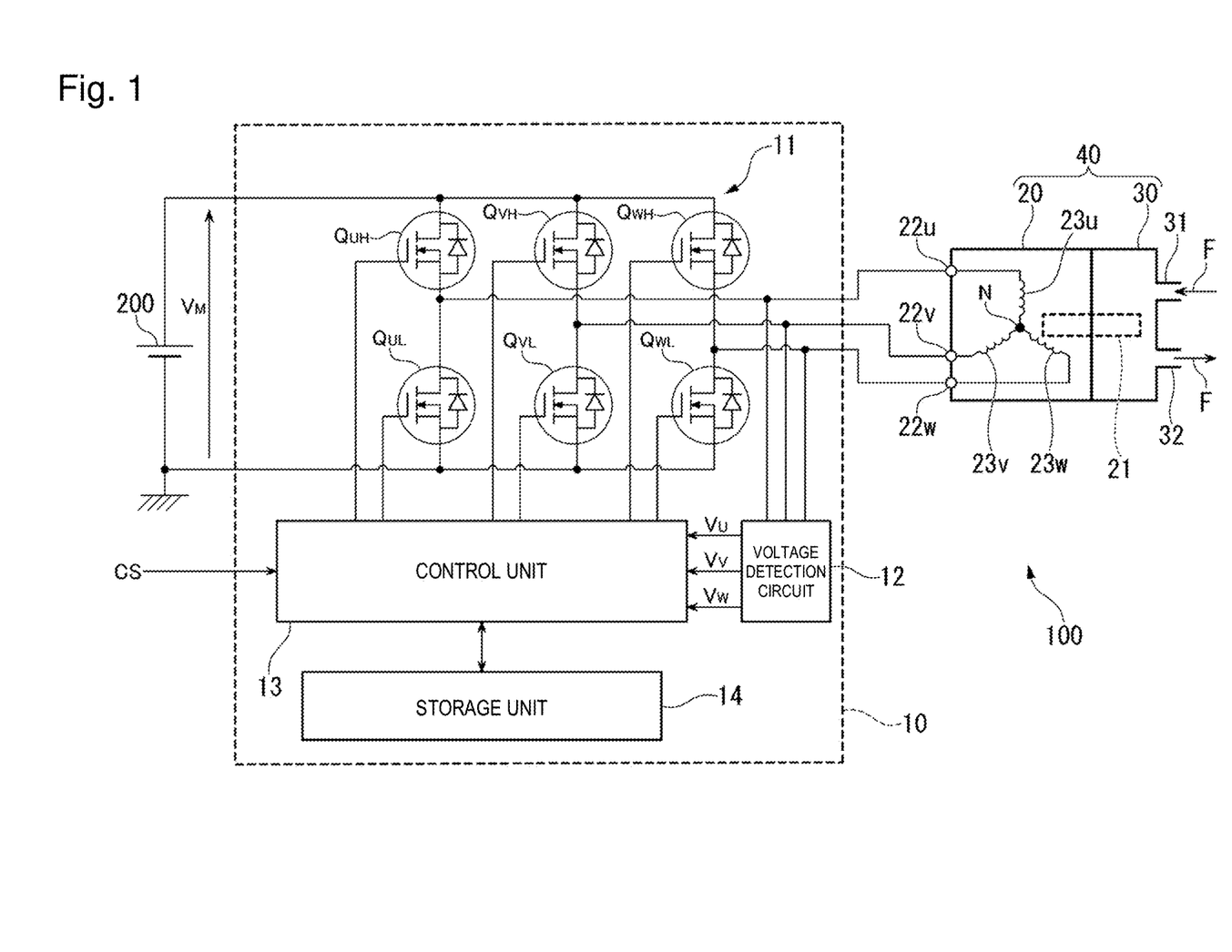
FIG. 1 is a block diagram schematically illustrating an electric pump device 100 including a motor control device 10 according to the present embodiment.

FIG. 1 is a block diagram schematically illustrating an electric pump device 100 including a motor control device 10 according to the present embodiment. As illustrated in FIG. 1, the electric pump device 100 includes the motor control device and an electric pump 40. The electric pump 40 includes a three-phase motor 20 and a pump 30. The electric pump device 100 is, for example, a device that supplies cooling oil F to a driving motor mounted on a hybrid vehicle.

The motor control device 10 is a device that controls the three-phase motor 20 of the electric pump 40 without a position sensor such as a Hall sensor. Specifically, the motor control device 10 detects, as a zero-cross point, a point at which induced voltage appearing in each three-phase terminal voltage of the three-phase motor 20 intersects a predetermined zero-cross determination level, and performs energization control of the three-phase motor 20 on the basis of a detection result of the zero-cross point. Details of the motor control device 10 will be described later.

The three-phase motor 20 is, for example, an inner-rotor type three-phase brushless DC motor, and is a sensorless motor having no position sensor such as a Hall sensor. The three-phase motor 20 includes a shaft 21, a U-phase terminal 22u, a V-phase terminal 22v, a W-phase terminal 22w, a U-phase coil 23u, a V-phase coil 23v, and a W-phase coil 23w.

Further, although not illustrated in FIG. 1, the three-phase motor 20 includes a motor housing, and a rotor and a stator that are housed in the motor housing. The rotor is a rotating body rotatably supported by a bearing component inside the motor housing. The stator is fixed in a state of surrounding an outer peripheral surface of the rotor inside the motor housing, and generates an electromagnetic force necessary for rotating the rotor.

The shaft 21 is a shaft-like body coaxially joined to the rotor in a state of axially penetrating the radially inner side of the rotor. The U-phase terminal 22u, the V-phase terminal 22v, and the W-phase terminal 22w are metal terminals exposed from a surface of the motor housing. Although details will be described later, the U-phase terminal 22u, the V-phase terminal 22v, and the W-phase terminal 22w are electrically connected to a drive circuit 11 of the motor control device 10. The U-phase coil 23u, the V-phase coil 23v, and the W-phase coil 23w are excitation coils provided in the stator. For example, the U-phase coil 23u, the V-phase coil 23v, and the W-phase coil 23w are star-connected inside the three-phase motor 20.

The U-phase coil 23u is electrically connected between the U-phase terminal 22u and a neutral point N. The V-phase coil 23v is electrically connected between the V-phase terminal 22v and the neutral point N. The W-phase coil 23w is electrically connected between the W-phase terminal 22w and the neutral point N. When the energization states of the U-phase coil 23u, the V-phase coil 23v, and the W-phase coil 23w are controlled by the motor control device 10, an electromagnetic force necessary for rotating the rotor is generated. When the rotor rotates, the shaft 21 also rotates in synchronization with the rotor.

The pump 30 is located on a first side in an axial direction of the shaft 21 of the three-phase motor 20, and is driven by the three-phase motor 20 via the shaft 21. When the pump 30 is driven by the three-phase motor 20, the pump 30 discharges the cooling oil F. The pump 30 has an oil suction port 31 and an oil discharge port 32. The cooling oil F is sucked into the pump 30 from the oil suction port 31 and then discharged to the outside of the pump 30 from the oil discharge port 32. As described above, the electric pump 40 is configured by connecting the pump 30 and the three-phase motor 20 adjacent to each other in the axial direction of the shaft 21.

The motor control device 10 is a device that controls the three-phase motor 20 without a position sensor on the basis of a rotation speed command signal CS output from a host control device (not illustrated). As an example, the host control device is an in-vehicle electronic control unit (ECU) mounted on a hybrid vehicle. The motor control device 10 includes the drive circuit 11, a voltage detection circuit 12 (voltage detection unit), a control unit 13, and a storage unit 14.

The drive circuit 11 is a circuit that converts DC power supply voltage $V_M$ into three-phase AC voltage and supplies the three-phase AC voltage to the three-phase motor 20. The drive circuit 11 converts the DC power supply voltage V M supplied from a DC power supply 200 into three-phase AC voltage and outputs the three-phase AC voltage to the three-phase motor 20. As an example, the DC power supply 200 is one of a plurality of batteries mounted on a hybrid vehicle, and supplies the DC power supply voltage $V_M$ of 12 V to, for example, a 12-V in-vehicle system.

The drive circuit 11 includes a U-phase upper arm switch $Q_{UH}$, a V-phase upper arm switch $Q_{VH}$, a W-phase upper arm switch $Q_{WH}$, a U-phase lower arm switch $Q_{UL}$, a V-phase lower arm switch $Q_{VL}$, and a W-phase lower arm switch $Q_{WL}$. In the present embodiment, each of the arm switches is, for example, an N-channel MOS-FET.

A drain terminal of the U-phase upper arm switch $Q_{UH}$, a drain terminal of the V-phase upper arm switch $Q_{VH}$, and a drain terminal of the W-phase upper arm switch $Q_{WH}$ are electrically connected to a positive electrode terminal of the DC power supply 200. A source terminal of the U-phase lower arm switch $Q_{UL}$, a source terminal of the V-phase lower arm switch $Q_{VL}$, and a source terminal of the W-phase lower arm switch $Q_{WL}$ are electrically connected to a negative electrode terminal of the DC power supply 200 via a shunt resistor 12. Note that the negative electrode terminal of the DC power supply 200 is electrically connected to the in-vehicle ground.

A source terminal of the U-phase upper arm switch $Q_{UH}$ is electrically connected to each of the U-phase terminal 22u of the three-phase motor 20 and a drain terminal of the U-phase lower arm switch $Q_{UL}$. A source terminal of the V-phase upper arm switch $Q_{VH}$ is electrically connected to each of the V-phase terminal 22v of the three-phase motor 20 and a drain terminal of the V-phase lower arm switch $Q_{VL}$. A source terminal of the W-phase upper arm switch $Q_{WH}$ is electrically connected to each of the W-phase terminal 22w of the three-phase motor 20 and a drain terminal of the W-phase lower arm switch $Q_{WL}$.

A gate terminal of the U-phase upper arm switch $Q_{UH}$, a gate terminal of the V-phase upper arm switch $Q_{VH}$, and a gate terminal of the W-phase upper arm switch $Q_{WH}$ are electrically connected to the control unit 13. Further, a gate terminal of the U-phase lower arm switch $Q_{UL}$, a gate terminal of the V-phase lower arm switch $Q_{VL}$, and a gate terminal of the W-phase lower arm switch $Q_{WL}$ are also electrically connected to the control unit 13.

As described above, the drive circuit 11 is configured of a three-phase full-bridge circuit having three upper arm switches and three lower arm switches. The drive circuit 11 configured as described above converts the DC power supply voltage $V_M$ supplied from the DC power supply 200 into three-phase AC voltage, with switching control of each of the arm switches by the control unit 13, and outputs the three-phase AC voltage to the three-phase motor 20.

In the present embodiment, a case where a sensorless 120° energization system is used as an energization system of the three-phase motor 20 will be exemplified. Hereinafter, for convenience of description, the voltage detection circuit 12, the control unit 13, and the storage unit 14 will be described after a basic principle of the sensorless 120° energization system is described. Note that the basic principle of the sensorless 120° energization system described below is merely an example, and the present invention is not limited to this.

Figure 2:
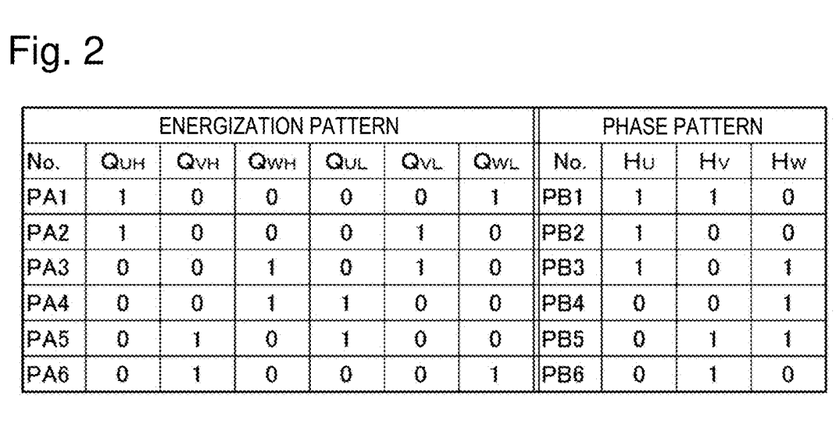
FIG. 2 is a diagram illustrating an example of an energization pattern and a phase pattern used in a sensorless 120° energization system in the present embodiment.

When the sensorless 120° energization system is used, each arm switch is subjected to switching control based on an energization pattern illustrated in FIG. 2. As illustrated in FIG. 2, an energization pattern of the 120° energization system includes six energization patterns PA1, PA2, PA3, PA4, PA5, and PA6. In FIG. 2, between "1" and "0" arranged in columns from "$Q_{UH}$" to "$Q_{WL}$", "1" means that a corresponding arm switch is controlled to be turned on, and "0" means that a corresponding arm switch is controlled to be turned off.

Figure 3:
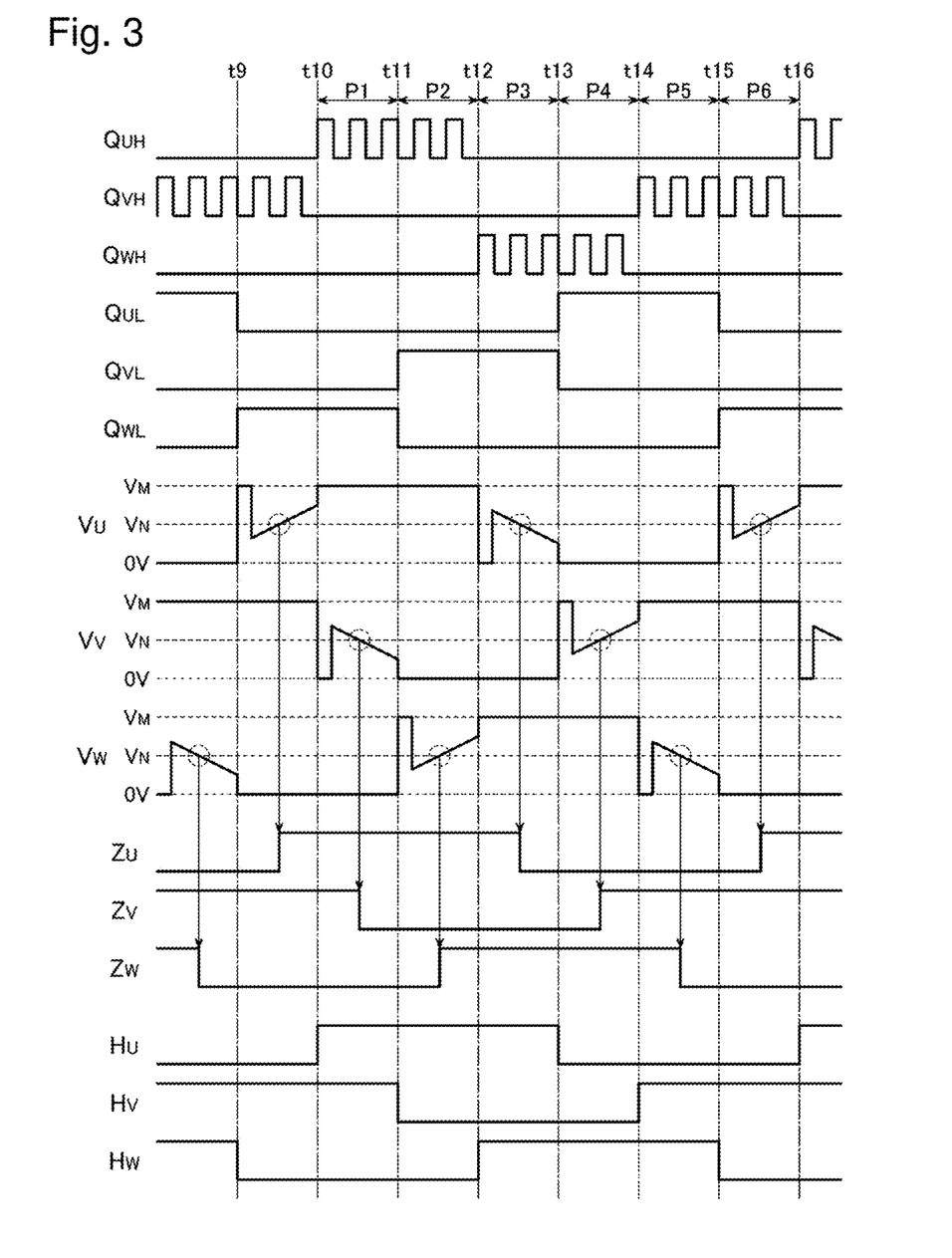
FIG. 3 is a timing chart illustrating a basic principle of the sensorless 120° energization system in the present embodiment.

In FIG. 3, an energization period P1 from time t10 to time t11 indicates a period in which each arm switch is subjected to switching control based on the energization pattern PA1. In the energization period P1, the U-phase upper arm switch $Q_{UH}$ and the W-phase lower arm switch $Q_{WL}$ are turned on, and the remaining arm switches are turned off. In the energization period P1, only the U-phase upper arm switch $Q_{UH}$ is subjected to switching control at a predetermined switching duty ratio. In the energization period P1, drive current (power supply current) flows to the U-phase coil 23u and the W-phase coil 23w from the U-phase terminal 22u toward the W-phase terminal 22w. That is, energization phases in the energization period P1 are the U phase and the W phase.

In FIG. 3, an energization period P2 from time t11 to time t12 indicates a period in which each arm switch is subjected to switching control based on the energization pattern PA2. In the energization period P2, the U-phase upper arm switch $Q_{UH}$ and the V-phase lower arm switch $Q_{VL}$ are turned on, and the remaining arm switches are turned off. Also in the energization period P2, only the U-phase upper arm switch $Q_{UH}$ is subjected to switching control at a predetermined switching duty ratio. In the energization period P2, drive current flows to the U-phase coil 23u and the V-phase coil 23v from the U-phase terminal 22u toward the V-phase terminal 22v. That is, energization phases in the energization period P2 are the U phase and the V phase.

In FIG. 3, an energization period P3 from time t12 to time t13 indicates a period in which each arm switch is subjected to switching control based on the energization pattern PA3. In the energization period P3, the W-phase upper arm switch $Q_{WH}$ and the V-phase lower arm switch $Q_{VL}$ are turned on, and the remaining arm switches are turned off. In the energization period P3, only the W-phase upper arm switch $Q_{WH}$ is subjected to switching control at a predetermined switching duty ratio. In the energization period P3, drive current flows to the W-phase coil 23w and the V-phase coil 23v from the W-phase terminal 22w toward the V-phase terminal 22v. That is, energization phases in the energization period P3 are the W phase and the V phase.

In FIG. 3, an energization period P4 from time t13 to time t14 indicates a period in which each arm switch is subjected to switching control based on the energization pattern PA4. In the energization period P4, the W-phase upper arm switch $Q_{WH}$ and the U-phase lower arm switch $Q_{UL}$ are turned on, and the remaining arm switches are turned off. Also in the energization period P4, only the W-phase upper arm switch $Q_{WH}$ is subjected to switching control at a predetermined switching duty ratio. In the energization period P4, drive current flows to the W-phase coil 23w and the U-phase coil 23u from the W-phase terminal 22w toward the U-phase terminal 22u. That is, energization phases in the energization period P4 are the W phase and the U phase.

In FIG. 3, an energization period P5 from time t14 to time t15 indicates a period in which each arm switch is subjected to switching control based on the energization pattern PA5. In the energization period P5, the V-phase upper arm switch $Q_{VH}$ and the U-phase lower arm switch $Q_{UL}$ are turned on, and the remaining arm switches are turned off. In the energization period P5, only the V-phase upper arm switch $Q_{VH}$ is subjected to switching control at a predetermined switching duty ratio. In the energization period P5, the power supply current flows to the V-phase coil 23v and the U-phase coil 23u from the V-phase terminal 22v toward the U-phase terminal 22u. That is, energization phases in the energization period P5 are the V phase and the U phase.

In FIG. 3, an energization period P6 from time t15 to time t16 indicates a period in which each arm switch is subjected to switching control based on the energization pattern PA6. In the energization period P6, the V-phase upper arm switch $Q_{VH}$ and the W-phase lower arm switch $Q_{WL}$ are turned on, and the remaining arm switches are turned off. Also in the energization period P6, only the V-phase upper arm switch $Q_{VH}$ is subjected to switching control at a predetermined switching duty ratio. In the energization period P6, the power supply current flows to the V-phase coil 23v and the W-phase coil 23w from the V-phase terminal 22v toward the W-phase terminal 22w. That is, energization phases in the energization period P6 are the V phase and the W phase.

By switching control of each arm switch according to the above-described six energization patterns, a rotating magnetic field that rotates the shaft 21 of the three-phase motor 20 by 360° in a certain direction is generated. As a result, in a period from time t10 to time t16, the shaft 21 of the three-phase motor 20 rotates by 360° in a certain direction. In other words, the shaft 21 of the three-phase motor 20 rotates by 60° in a certain direction during each of the energization period P1 to the energization period P6.

A speed at which an energization pattern is switched, that is, a speed at which an energization phase is switched, is referred to as a commutation frequency Fs. The unit of the commutation frequency Fs is "Hz". When a period during which switching control is performed in one energization pattern is P (seconds), the commutation frequency Fs is expressed by "Fs=1/P".

FIG. 3 illustrates a waveform of voltage appearing at the U-phase terminal 22u, the V-phase terminal 22v, and the W-phase terminal 22w of the three-phase motor 20. In FIG. 3, "Vu" is U-phase terminal voltage appearing at the U-phase terminal 22u. "Vv" is V-phase terminal voltage appearing at the V-phase terminal 22v. "Vw" is W-phase terminal voltage appearing at the W-phase terminal 22w. Note that an actual waveform of the U-phase terminal voltage Vu, the V-phase terminal voltage Vv, and the W-phase terminal voltage Vw has the same duty ratio as a switching duty ratio, but FIG. 3 illustrates only an envelope of a voltage waveform for convenience.

The U-phase terminal voltage Vu has an effective voltage value determined by a switching duty ratio in the energization periods P1 and P2, and has a value of a ground level, that is, 0 V in the energization periods P4 and P5. The V-phase terminal voltage Vv has an effective voltage value determined by a switching duty ratio in the energization periods P5 and P6, and has 0 V in the energization periods P2 and P3. The W-phase terminal voltage Vw has an effective voltage value determined by a switching duty ratio in the energization periods P3 and P4, and has 0 V in the energization periods P1 and P6. As described above, in the sensorless 120° energization system, a phase in which drive voltage necessary for driving the three-phase motor 20 is applied is switched every 120°.

Although drive current does not flow through the U-phase coil 23u in the energization period P3, energy accumulated in the U-phase coil 23u causes reflux current to flow through the U-phase coil 23u via a body diode of the U-phase lower arm switch $Q_{UL}$ for a certain period of time. As a result, a ringing phenomenon in which the U-phase terminal voltage Vu has 0 V for a certain period of time from the start point of the period P3 occurs. After the above, the U-phase terminal voltage Vu matches induced voltage generated in the U-phase coil 23u. In the energization period P3, induced voltage intersects neutral point voltage $V_N$, which is voltage at the neutral point N, from the high voltage side to the low voltage side at the center of the energization period P3, that is, at a timing when the three-phase motor 20 rotates by 30° from a start point of the energization period P3.

Similarly, drive current does not flow through the U-phase coil 23u in the energization period P6, but energy accumulated in the U-phase coil 23u causes reflux current to flow through the U-phase coil 23u via a body diode of the U-phase upper arm switch $Q_{UH}$ for a certain period of time. As a result, a ringing phenomenon in which the U-phase terminal voltage Vu becomes the DC power supply voltage $V_M$ for a certain period of time from a start point of the energization period P6 occurs. After the above, the U-phase terminal voltage Vu matches induced voltage generated in the U-phase coil 23u. In the energization period P6, induced voltage intersects the neutral point voltage $V_N$ from the low voltage side to the high voltage side at the center of the energization period P6, that is, at a timing when the three-phase motor 20 rotates by 30° from a start point of the energization period P6.

As described above, while the three-phase motor 20 rotates by 360°, induced voltage is exposed to the U-phase terminal 22u only in the energization periods P3 and P6. According to a similar principle, while the three-phase motor 20 rotates by 360°, induced voltage is exposed to the V-phase terminal 22v only in the energization periods P1 and P4, and induced voltage is exposed to the W-phase terminal 22w only in the energization periods P2 and P5. In the sensorless 120° energization system, in order to detect a phase of the three-phase motor 20, it is necessary to detect a zero-cross point which is a point at which the neutral point voltage $V_N$ and induced voltage intersect.

In FIG. 3, "Zu" is a U-phase zero-cross point detection signal that becomes a low level at a timing when induced voltage exposed to the U-phase terminal 22u becomes equal to or less than the neutral point voltage $V_N$, and becomes a high level at a timing when induced voltage exposed to the U-phase terminal 22u becomes higher than the neutral point voltage $V_N$. "Zv" is a V-phase zero-cross point detection signal that becomes a low level at a timing when induced voltage exposed to the V-phase terminal 22v becomes equal to or less than the neutral point voltage $V_N$, and becomes a high level at a timing when induced voltage exposed to the V-phase terminal 22v becomes higher than the neutral point voltage $V_N$. "Zw" is a W-phase zero-cross point detection signal that becomes a low level at a timing when induced voltage exposed to the W-phase terminal 22w becomes equal to or less than the neutral point voltage $V_N$, and becomes a high level at a timing when induced voltage exposed to the W-phase terminal 22w becomes higher than the neutral point voltage $V_N$.

In FIG. 3, "Hu" is a U-phase phase detection signal having a phase delay of 30° with respect to the U-phase zero-cross point detection signal Zu. "Hv" is a V-phase phase detection signal having a phase delay of 30° with respect to the V-phase zero-cross point detection signal Zv. "Hw" is a W-phase phase detection signal having a phase delay of 30° with respect to the W-phase zero-cross point detection signal Zw.

Note that the three-phase motor 20 rotates by 60° during time between two zero-cross points adjacent to each other on a time axis. For this reason, by measuring time between two zero-cross points adjacent on a time axis and delaying the U-phase zero-cross point detection signal Zu by half a result of the measurement, the U-phase phase detection signal Hu having a phase delay of 30° with respect to the U-phase zero-cross point detection signal Zu can be generated. The V-phase phase detection signal Hv and the W-phase phase detection signal Hw can also be generated by a similar method.

FIG. 3 shows that levels of the U-phase phase detection signal Hu, the V-phase phase detection signal Hv, and the W-phase phase detection signal Hw regularly change depending on the six energization patterns. Hereinafter, a pattern in which the levels of the U-phase phase detection signal Hu, the V-phase phase detection signal Hv, and the W-phase phase detection signal Hw change depending on an energization pattern is referred to as a phase pattern. As illustrated in FIG. 2, the phase pattern of the sensorless 120° energization system includes six phase patterns PB1, PB2, PB3, PB4, PB5, and PB6. In FIG. 2, between "1" and "0" arranged in columns of "$H_U$", "$H_V$", and "$H_W$", "1" means that a corresponding phase detection signal is at a high level, and "0" means that a corresponding phase detection signal is at a low level.

In the sensorless 120° energization system, the phase pattern is recognized for each energization period based on three of the phase detection signals Hu, Hv, and Hw, and an energization pattern to be used in a next energization period is determined based on a recognition result of the phase pattern. Then, an energization pattern is switched to a next energization pattern at a timing when the phase pattern changes.

As illustrated in FIG. 3, for example, in the energization period P1, it is recognized that the phase pattern in the energization period P1 is the phase pattern PB1 from the phase detection signals Hu, Hv, and Hw. Since the phase pattern of the energization period P1 is the phase pattern PB1, the energization pattern PA2 is determined as an energization pattern to be used in the next energization period P2. Then, the energization pattern is switched from the energization pattern PA1 to the energization pattern PA2 at a timing when the phase pattern PB1 changes, that is, at a timing when a falling edge occurs in the V-phase phase detection signal Hv.

In the sensorless 120° energization system, the switching of an energization pattern as described above is performed at intervals of 60° in synchronization with the phase detection signals Hu, Hv, and Hw generated using induced voltage generated in the three-phase motor 20, so that rotation of the three-phase motor 20 can be controlled without a position sensor such as a Hall sensor. Hereinafter, performing energization control of the three-phase motor 20 in synchronization with the phase detection signals Hu, Hv, and Hw generated using induced voltage generated in the three-phase motor 20 is referred to as "sensorless synchronization control".

The basic principle of the sensorless 120° energization system is described above. In order to generate the phase detection signals Hu, Hv, and Hw in the sensorless 120° energization system, it is necessary to detect a zero-cross point, which is a point at which the neutral point voltage $V_N$ of the three-phase motor 20 and induced voltage intersect with each other, but if a rotation speed of the three-phase motor 20 is not equal to or more than a predetermined rotation speed, induced voltage by which a zero-cross point can be detected is not generated. In description below, a minimum rotation speed required to generate induced voltage by which a zero-cross point can be detected is referred to as a limit minimum rotation speed.

For example, in a case where the electric pump device 100 is used in a low temperature environment, a load on the three-phase motor 20 becomes large due to high viscosity of the cooling oil F, and thus, it is necessary to rotate the three-phase motor 20 at a relatively low rotation speed. Under such a low temperature environment, the three-phase motor 20 may be rotated at a rotation speed close to the limit minimum rotation speed. In this case, it has been found by a study of the inventor of the present application that, when the neutral point voltage $V_N$ (=$V_M$/2) is set as a zero-cross determination level and a point at which the zero-cross determination level and induced voltage intersect is detected as a zero-cross point, there is a possibility that it becomes difficult to stably perform sensorless synchronization control of the three-phase motor 20 for a reason described below.

As a result of the study by the inventor of the present application, it has been found that, in a case where extremely low speed rotation control of rotating the three-phase motor 20 at a rotation speed close to the limit minimum rotation speed is performed under a low temperature environment, a waveform of each induced voltage is distorted due to increase in power supply current flowing through the drive circuit 11 (drive current flowing through the three-phase motor 20).

Figure 4:
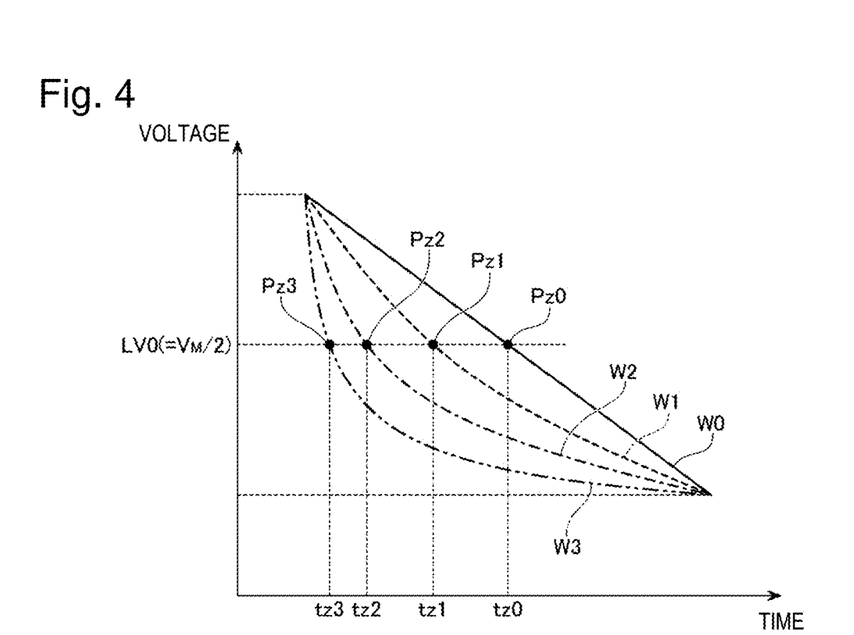
FIG. 4 is a first diagram schematically illustrating a waveform of induced voltage appearing in U-phase terminal voltage Vu in an energization period P3, a waveform of induced voltage appearing in V-phase terminal voltage Vv in an energization period P1, and a waveform of induced voltage appearing in W-phase terminal voltage Vw in an energization period P5.

FIG. 4 is a diagram schematically illustrating a waveform of induced voltage appearing in the U-phase terminal voltage Vu in the energization period P3, a waveform of induced voltage appearing in the V-phase terminal voltage Vv in the energization period P1, and a waveform of induced voltage appearing in the W-phase terminal voltage Vw in the energization period P5.

In FIG. 4, a waveform W1 is a waveform of induced voltage appearing in the U-phase terminal voltage Vu in the energization period P3 in a case where the extremely low speed rotation control of the three-phase motor 20 is performed. Hereinafter, the waveform W1 is referred to as a first U-phase induced voltage waveform.

In FIG. 4, a waveform W2 is a waveform of induced voltage appearing in the V-phase terminal voltage Vv in the energization period P1 in a case where the extremely low speed rotation control of the three-phase motor 20 is performed. Hereinafter, the waveform W2 is referred to as a first V-phase induced voltage waveform.

In FIG. 4, a waveform W3 is a waveform of induced voltage that appears in the W-phase terminal voltage Vw in the energization period P5 in a case where the extremely low speed rotation control of the three-phase motor 20 is performed. Hereinafter, the waveform W3 is referred to as a first W-phase induced voltage waveform.

In FIG. 4, a waveform W0 is a waveform of induced voltage appearing in the U-phase terminal voltage Vu in the energization period P3 in a case where the three-phase motor 20 is rotated at a rotation speed at which induced voltage sufficient to detect a zero-cross point is generated. Hereinafter, the waveform W0 is referred to as a first ideal induced voltage waveform.

FIG. 4 shows that in a case where the extremely low speed rotation control of the three-phase motor 20 is performed, a waveform of induced voltage appearing in terminal voltage of each phase during an energization period in which induced voltage decreases is significantly distorted as compared with the first ideal induced voltage waveform W0. For example, in an energization period in which induced voltage decreases, the first V-phase induced voltage waveform W2 is distorted more significantly than the first U-phase induced voltage waveform W1, and the first W-phase induced voltage waveform W3 is distorted more significantly than the first V-phase induced voltage waveform W2. Note that waveforms of induced voltage illustrated in FIG. 4 are merely examples. During an energization period during which induced voltage decreases, magnitude of distortion generated in each waveform of induced voltage may be different from that in the example of FIG. 4.

In FIG. 4, LV0 is a zero-cross determination level set to the neutral point voltage $V_N$ (=$V_M$/2). Hereinafter, LV0 is referred to as an ideal zero-cross determination level.

In FIG. 4, Pz0 is a zero-cross point at which the ideal zero-cross determination level LV0 intersects the first ideal induced voltage waveform W0. Hereinafter, Pz0 is referred to as a first ideal zero-cross point.

In FIG. 4, tz0 is a timing at which the first ideal zero-cross point Pz0 is detected. Hereinafter, tz0 is referred to as a first ideal zero-cross detection timing.

In FIG. 4, Pz1 is a zero-cross point at which the ideal zero-cross determination level LV0 intersects the first U-phase induced voltage waveform W1. Hereinafter, Pz1 is referred to as a first U-phase zero-cross point.

In FIG. 4, tz1 is a timing at which the first U-phase zero-cross point Pz1 is detected. Hereinafter, tz1 is referred to as a first U-phase zero-cross detection timing.

As illustrated in FIG. 4, the first U-phase zero-cross point Pz1 is shifted to the left side of the first ideal zero-cross point Pz0 due to distortion of the first U-phase induced voltage waveform W1 as compared to the first ideal induced voltage waveform W0, so that the first U-phase zero-cross detection timing tz1 is shifted to the left side of the first ideal zero-cross detection timing tz0.

In FIG. 4, Pz2 is a zero-cross point at which the ideal zero-cross determination level LV0 intersects the first V-phase induced voltage waveform W2. Hereinafter, Pz2 is referred to as a first V-phase zero-cross point.

In FIG. 4, tz2 is a timing at which the first V-phase zero-cross point Pz2 is detected. Hereinafter, tz2 is referred to as a first V-phase zero-cross detection timing.

As illustrated in FIG. 4, the first V-phase zero-cross point Pz2 is shifted to the left side of the first U-phase zero-cross point Pz1 due to distortion of the first V-phase induced voltage waveform W2 more than that of the first U-phase induced voltage waveform W1, so that the first V-phase zero-cross detection timing tz2 is shifted to the left side of the first U-phase zero-cross detection timing tz1.

In FIG. 4, Pz3 is a zero-cross point at which the ideal zero-cross determination level LV0 intersects the first W-phase induced voltage waveform W3. Hereinafter, Pz3 is referred to as a first W-phase zero-cross point.

In FIG. 4, tz3 is a timing at which the first W-phase zero-cross point Pz3 is detected. Hereinafter, tz3 is referred to as a first W-phase zero-cross detection timing.

As illustrated in FIG. 4, the first W-phase zero-cross point Pz3 is shifted to the left side of the first V-phase zero-cross point Pz2 due to distortion of the first W-phase induced voltage waveform W3 more than that of the first V-phase induced voltage waveform W2, so that the first W-phase zero-cross detection timing tz3 is shifted to the left side of the first V-phase zero-cross detection timing tz2.

Figure 5:
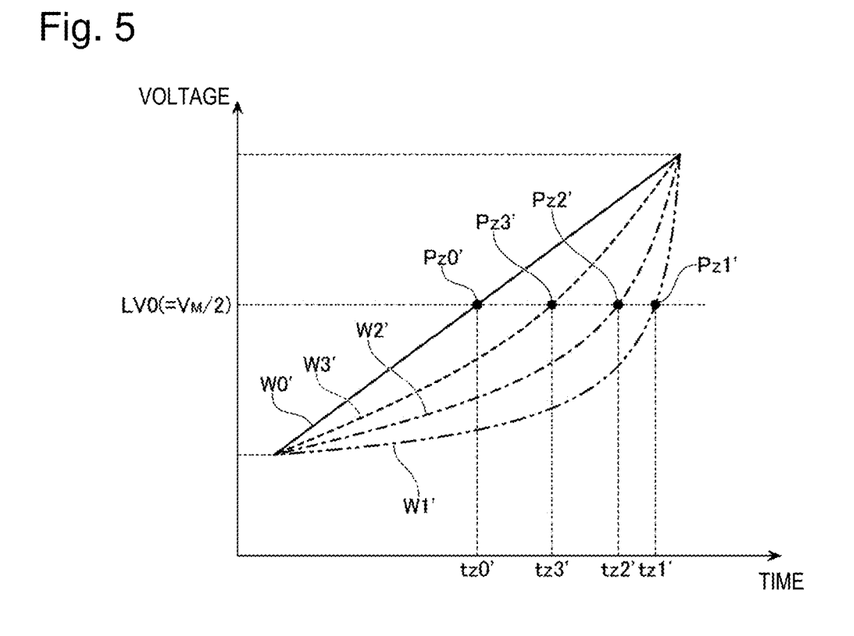
FIG. 5 is a first diagram schematically illustrating a waveform of induced voltage appearing in the U-phase terminal voltage Vu in an energization period P6, a waveform of induced voltage appearing in the V-phase terminal voltage Vv in an energization period P4, and a waveform of induced voltage appearing in the W-phase terminal voltage Vw in an energization period P2.

FIG. 5 is a diagram schematically illustrating a waveform of induced voltage appearing in the U-phase terminal voltage Vu in the energization period P6, a waveform of induced voltage appearing in the V-phase terminal voltage Vv in the energization period P4, and a waveform of induced voltage appearing in the W-phase terminal voltage Vw in the energization period P2.

In FIG. 5, a waveform W1' is a waveform of induced voltage appearing in the U-phase terminal voltage Vu in the energization period P6 in a case where the extremely low speed rotation control of the three-phase motor 20 is performed. Hereinafter, the waveform W1' is referred to as a second U-phase induced voltage waveform.

In FIG. 5, a waveform W2' is a waveform of induced voltage appearing in the V-phase terminal voltage Vv in the energization period P4 in a case where the extremely low speed rotation control of the three-phase motor 20 is performed. Hereinafter, the waveform W2' is referred to as a second V-phase induced voltage waveform.

In FIG. 5, a waveform W3' is a waveform of induced voltage that appears in the W-phase terminal voltage Vw in the energization period P2 in a case where the extremely low speed rotation control of the three-phase motor 20 is performed. Hereinafter, the waveform W3' is referred to as a second W-phase induced voltage waveform.

In FIG. 5, a waveform W0' is a waveform of induced voltage appearing in the U-phase terminal voltage Vu in the energization period P6 in a case where the three-phase motor 20 is rotated at a rotation speed at which induced voltage sufficient for detecting a zero-cross point is generated. Hereinafter, the waveform W0' is referred to as a second ideal induced voltage waveform.

FIG. 5 shows that in a case where the extremely low speed rotation control of the three-phase motor 20 is performed, a waveform of induced voltage appearing in terminal voltage of each phase in an energization period in which induced voltage increases is significantly distorted as compared with the second ideal induced voltage waveform W0'. For example, in an energization period in which induced voltage increases, the second V-phase induced voltage waveform W2' is distorted more significantly than the second W-phase induced voltage waveform W3', and the second U-phase induced voltage waveform W1' is distorted more significantly than the second V-phase induced voltage waveform W2'. Note that waveforms of the induced voltage illustrated in FIG. 5 are merely examples. During an energization period during which induced voltage increases, magnitude of distortion generated in each waveform of induced voltage may be different from that in the example illustrated in FIG. 5.

In FIG. 5, Pz0' is a zero-cross point at which the ideal zero-cross determination level LV0 intersects the second ideal induced voltage waveform W0'. Hereinafter, Pz0' is referred to as a second ideal zero-cross point.

In FIG. 5, tz0' is a timing at which the second ideal zero-cross point Pz0' is detected. Hereinafter, tz0' is referred to as a second ideal zero-cross detection timing.

In FIG. 5, Pz3' is a zero-cross point at which the ideal zero-cross determination level LV0 intersects the second W-phase induced voltage waveform W3'. Hereinafter, Pz3' is referred to as a second W-phase zero-cross point.

In FIG. 5, tz3' is a timing at which the second W-phase zero-cross point Pz3' is detected. Hereinafter, tz3' is referred to as a second W-phase zero-cross detection timing.

As shown in FIG. 5, due to distortion of the second W-phase induced voltage waveform W3' as compared to the second ideal induced voltage waveform W0', the second W-phase zero-cross point Pz3' is shifted to the right side of the second ideal zero-cross point Pz0', so that the second W-phase zero-cross detection timing tz3' is shifted to the right side of the second ideal zero-cross detection timing tz0'.

In FIG. 5, Pz2' is a zero-cross point at which the ideal zero-cross determination level LV0 intersects the second V-phase induced voltage waveform W2'. Hereinafter, Pz2' is referred to as a second V-phase zero-cross point.

In FIG. 5, tz2' is a timing at which the second V-phase zero-cross point Pz2' is detected. Hereinafter, tz2' is referred to as a second V-phase zero-cross detection timing.

As illustrated in FIG. 5, due to the second V-phase induced voltage waveform W2' being distorted more significantly than the second W-phase induced voltage waveform W3', the second V-phase zero-cross point Pz2' is shifted to the right side of the second W-phase zero-cross point Pz3', so that the second V-phase zero-cross detection timing tz2' is shifted to the right side of the second W-phase zero-cross detection timing tz3'.

In FIG. 5, Pz1' is a zero-cross point at which the ideal zero-cross determination level LV0 intersects the second U-phase induced voltage waveform W1'. Hereinafter, Pz1' is referred to as a second U-phase zero-cross point.

In FIG. 5, tz1' is a timing at which the second U-phase zero-cross point Pz1' is detected. Hereinafter, tz1' is referred to as a second U-phase zero-cross detection timing.

As illustrated in FIG. 5, due to the second U-phase induced voltage waveform W1' being distorted more significantly than the second V-phase induced voltage waveform W2', the second U-phase zero-cross point Pz1' is shifted to the right side of the second V-phase zero-cross point Pz2', so that the second U-phase zero-cross detection timing tz1' is shifted to the right side of the second V-phase zero-cross detection timing tz2'.

As described above, in a case where the extremely low speed rotation control is performed, a zero-cross detection timing of each phase is shifted to the left side of the first ideal zero-cross detection timing tz0 in an energization period in which induced voltage decreases due to a waveform of induced voltage appearing in terminal voltage of each phase being significantly distorted. Further, in an energization period in which induced voltage increases, a zero-cross detection timing of each phase shifts to the right side of the second ideal zero-cross detection timing tz0'.

As a result, a generation timing of a rising edge and a falling edge of the phase detection signals Hu, Hv, and Hw deviates from an ideal timing, and an energization pattern cannot be switched accurately at intervals of 60°. This is a reason why it is difficult to stably perform sensorless synchronization control of the three-phase motor 20 when a point at which a zero-cross determination level set to the neutral point voltage $V_N (=V_M/2)$ intersects induced voltage is detected as a zero-cross point in a case where the extremely low speed rotation control of the three-phase motor 20 is performed.

In order to solve the above technical problem, in the present embodiment, a value of a zero-cross determination level is changed when induced voltage of at least one of three phases increases and decreases. Hereinafter, with reference to FIGS. 6 and 7, a reason why sensorless synchronization control of the three-phase motor 20 can be stably performed as a value of a zero-cross determination level is changed when induced voltage increases and decreases will be described.

Figure 6:
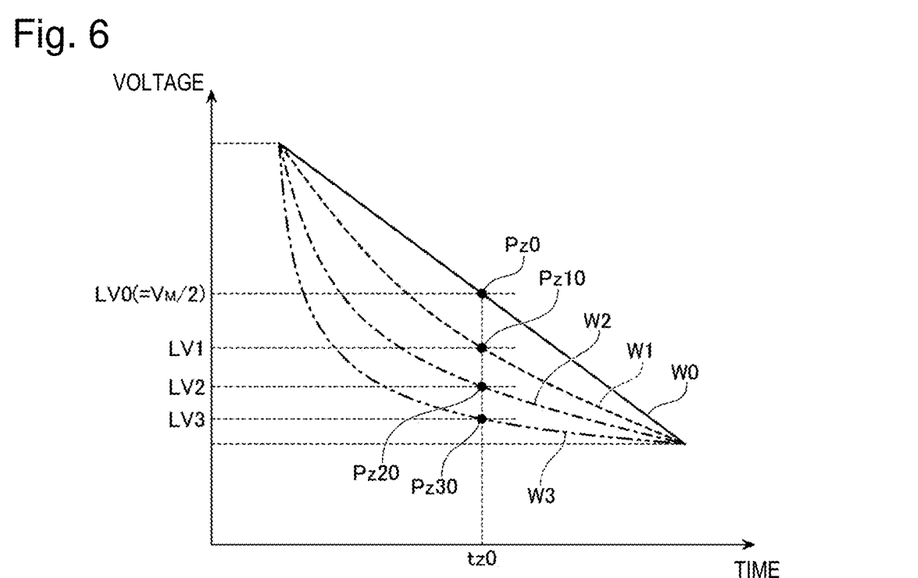
FIG. 6 is a second diagram schematically illustrating a waveform of induced voltage appearing in the U-phase terminal voltage Vu in the energization period P3, a waveform of induced voltage appearing in the V-phase terminal voltage Vv in the energization period P1, and a waveform of induced voltage appearing in the W-phase terminal voltage Vw in the energization period P5.

In FIG. 6, LV1 is a zero-cross determination level having a value lower than the ideal zero-cross determination level LV0. Hereinafter, LV1 is referred to as a first U-phase zero-cross determination level. In FIG. 6, Pz10 is a zero-cross point at which the first U-phase zero-cross determination level LV1 intersects the first U-phase induced voltage waveform W1. Hereinafter, Pz10 is referred to as a first U-phase offset zero-cross point. As illustrated in FIG. 6, a timing at which the first U-phase offset zero-cross point Pz10 is detected coincides with the first ideal zero-cross detection timing tz0.

In FIG. 6, LV2 is a zero-cross determination level having a value lower than the first U-phase zero-cross determination level LV1. Hereinafter, LV2 is referred to as a first V-phase zero-cross determination level. In FIG. 6, Pz20 is a zero-cross point at which the first V-phase zero-cross determination level LV2 intersects the first V-phase induced voltage waveform W2. Hereinafter, Pz20 is referred to as a first V-phase offset zero-cross point. As illustrated in FIG. 6, a timing at which the first V-phase offset zero-cross point Pz20 is detected coincides with the first ideal zero-cross detection timing tz0.

In FIG. 6, LV3 is a zero-cross determination level having a value lower than the first V-phase zero-cross determination level LV2. Hereinafter, LV3 is referred to as a first W-phase zero-cross determination level. In FIG. 6, Pz30 is a zero-cross point at which the first W-phase zero-cross determination level LV3 intersects the first W-phase induced voltage waveform W3. Hereinafter, Pz30 is referred to as a first W-phase offset zero-cross point. As illustrated in FIG. 6, a timing at which the first W-phase offset zero-cross point Pz30 is detected coincides with the first ideal zero-cross detection timing tz0.

As illustrated in FIG. 6, by changing a value of a zero-cross determination level from the ideal zero-cross determination level LV0 to the first U-phase zero-cross determination level LV1 in an energization period in which induced voltage appearing in the U-phase terminal voltage Vu decreases, a detection timing of a zero-cross point at which induced voltage appearing in the U-phase terminal voltage Vu and a zero-cross determination level intersect can be matched with the first ideal zero-cross detection timing tz0.

Further, by changing a value of a zero-cross determination level from the ideal zero-cross determination level LV0 to the first V-phase zero-cross determination level LV2 in an energization period in which induced voltage appearing in the V-phase terminal voltage Vv decreases, a detection timing of a zero-cross point at which induced voltage appearing in the V-phase terminal voltage Vv and a zero-cross determination level intersect can be matched with the first ideal zero-cross detection timing tz0.

Furthermore, by changing a value of a zero-cross determination level from the ideal zero-cross determination level LV0 to the first W-phase zero-cross determination level LV3 in an energization period in which induced voltage appearing in the W-phase terminal voltage Vw decreases, a detection timing of a zero-cross point at which induced voltage appearing in the W-phase terminal voltage Vw and a zero-cross determination level intersect can be matched with the first ideal zero-cross detection timing tz0.

Figure 7:
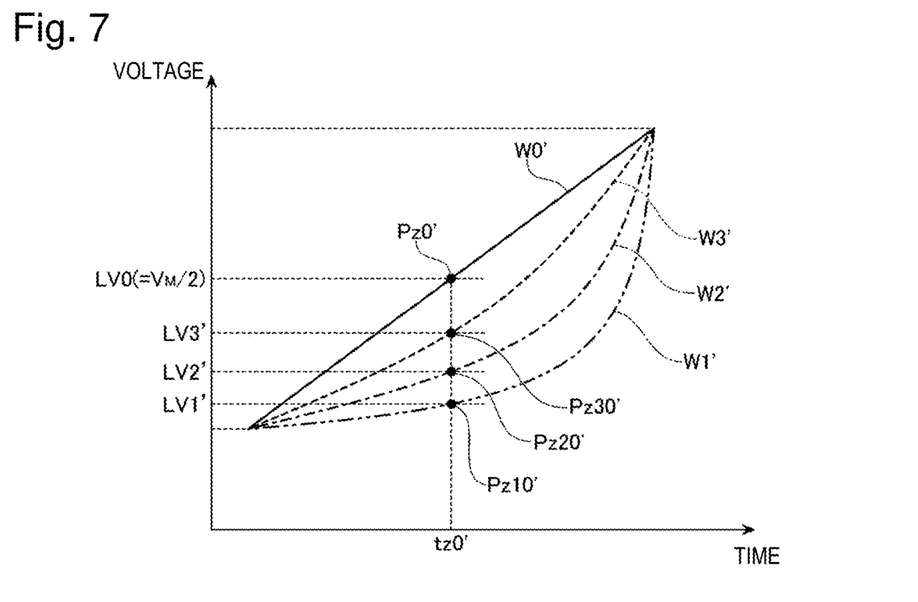
FIG. 7 is a second diagram schematically illustrating a waveform of induced voltage appearing in the U-phase terminal voltage Vu in the energization period P6, a waveform of induced voltage appearing in the V-phase terminal voltage Vv in the energization period P4, and a waveform of induced voltage appearing in the W-phase terminal voltage Vw in the energization period P2.

In FIG. 7, LV3' is a zero-cross determination level having a value lower than the ideal zero-cross determination level LV0. Hereinafter, LV3' is referred to as a second W-phase zero-cross determination level. In FIG. 7, Pz30' is a zero-cross point at which the second W-phase zero-cross determination level LV3' intersects the second W-phase induced voltage waveform W3'. Hereinafter, Pz30' is referred to as a second W-phase offset zero-cross point. As illustrated in FIG. 7, a timing at which the second W-phase offset zero-cross point Pz30' is detected coincides with the second ideal zero-cross detection timing tz0'.

In FIG. 7, LV2' is a zero-cross determination level having a value lower than the second W-phase zero-cross determination level LV3'. Hereinafter, LV2' is referred to as a second V-phase zero-cross determination level. In FIG. 7, Pz20' is a zero-cross point at which the second V-phase zero-cross determination level LV2' intersects the second V-phase induced voltage waveform W2'. Hereinafter, Pz20' is referred to as a second V-phase offset zero-cross point. As illustrated in FIG. 7, a timing at which the second V-phase offset zero-cross point Pz20' is detected coincides with the second ideal zero-cross detection timing tz0'.

In FIG. 7, LV1' is a zero-cross determination level having a value lower than the second V-phase zero-cross determination level LV2'. Hereinafter, LV1' is referred to as a second U-phase zero-cross determination level. In FIG. 7, Pz10' is a zero-cross point at which the second U-phase zero-cross determination level LV1' intersects the second U-phase induced voltage waveform W1'. Hereinafter, Pz10' is referred to as a second U-phase offset zero-cross point. As illustrated in FIG. 7, a timing at which the second U-phase offset zero-cross point Pz10' is detected coincides with the second ideal zero-cross detection timing tz0'.

As illustrated in FIG. 7, by changing a value of a zero-cross determination level from the ideal zero-cross determination level LV0 to the second U-phase zero-cross determination level LV1' in an energization period in which induced voltage appearing in the U-phase terminal voltage Vu increases, a detection timing of a zero-cross point at which induced voltage appearing in the U-phase terminal voltage Vu and a zero-cross determination level intersect can be matched with the second ideal zero-cross detection timing tz0'.

Further, by changing a value of a zero-cross determination level from the ideal zero-cross determination level LV0 to the second V-phase zero-cross determination level LV2' in an energization period in which induced voltage appearing in the V-phase terminal voltage Vv increases, a detection timing of a zero-cross point at which induced voltage appearing in the V-phase terminal voltage Vv and a zero-cross determination level intersect can be matched with the second ideal zero-cross detection timing tz0'.

Furthermore, by changing a value of a zero-cross determination level from the ideal zero-cross determination level LV0 to the second W-phase zero-cross determination level LV3' in an energization period in which induced voltage appearing in the W-phase terminal voltage Vw increases, a detection timing of a zero-cross point at which induced voltage appearing in the W-phase terminal voltage Vw and a zero-cross determination level intersect can be matched with the second ideal zero-cross detection timing tz0'.

As described above, by changing a value of a zero-cross determination level when induced voltage increases and decreases, a zero-cross detection timing can be substantially matched with the first ideal zero-cross detection timing tz0 or the second ideal zero-cross detection timing tz0' even if a waveform of induced voltage appearing in each terminal voltage of three phases is distorted when the extremely low speed rotation control of the three-phase motor 20 is performed. As a result, a generation timing of a rising edge and a falling edge of the phase detection signals Hu, Hv, and Hw can be substantially matched with an ideal timing, and an energization pattern can be switched at intervals of 60° with high accuracy. This makes it possible to stably perform sensorless synchronization control of the three-phase motor 20 when the extremely low speed rotation control of the three-phase motor 20 is performed.

Hereinafter, the voltage detection circuit 12, the control unit 13, and the storage unit 14 included in the motor control device 10 of the present embodiment will be described based on the description of the basic principle of the sensorless 120° energization system and the description of the technical effect obtained by changing a value of a zero-cross determination level when induced voltage increases and decreases.

The voltage detection circuit 12 is a circuit that detects terminal voltage of three phases of the three-phase motor 20. The voltage detection circuit 12 is electrically connected to each of the U-phase terminal 22u, the V-phase terminal 22v, and the W-phase terminal 22w of the three-phase motor 20. The voltage detection circuit 12 detects the U-phase terminal voltage Vu, which is voltage of the U-phase terminal 22u, and supplies the detected value to the control unit 13. The voltage detection circuit 12 detects the V-phase terminal voltage Vv, which is voltage of the V-phase terminal 22v, and supplies the detected value to the control unit 13. The voltage detection circuit 12 detects the W-phase terminal voltage Vw, which is voltage of the W-phase terminal 22w, and supplies the detected value to the control unit 13. As an example, the voltage detection circuit 12 includes a resistance voltage divider circuit.

The control unit 13 is, for example, a microprocessor such as a microcontroller unit (MCU). A rotation speed command signal CS output from a host control device (not illustrated) is input to the control unit 13. The rotation speed command signal CS is a signal instructing a target rotation speed of the three-phase motor 20. The control unit 13 is communicably connected to the storage unit 14 via a communication bus (not illustrated). Although details will be described later, the control unit 13 executes processing of rotating the three-phase motor 20 at a target rotation speed instructed by the rotation speed command signal CS according to a program stored in advance in the storage unit 14.

The control unit 13 performs A/D conversion on output voltage of the voltage detection circuit 12 to acquire the U-phase terminal voltage Vu, the V-phase terminal voltage Vv, and the W-phase terminal voltage Vw as digital data. The control unit 13 detects a point at which induced voltage appearing in each terminal voltage of three phases intersects a predetermined zero-cross determination level as a zero-cross point, and controls the drive circuit 11 on the basis of the detection result of a zero-cross point.

Specifically, the control unit 13 generates the U-phase zero-cross point detection signal Zu based on a detection result of a zero-cross point at which induced voltage appearing in the U-phase terminal voltage Vu intersects a zero-cross determination level, and generates the U-phase phase detection signal Hu having a phase delay of 30° with respect to the U-phase zero-cross point detection signal Zu.

Further, the control unit 13 generates the V-phase zero-cross point detection signal Zv on the basis of a detection result of a zero-cross point at which induced voltage appearing in the V-phase terminal voltage Vv intersects a zero-cross determination level, and generates the V-phase phase detection signal Hv having a phase delay of 30° with respect to the V-phase zero-cross point detection signal Zv.

Further, the control unit 13 generates the W-phase zero-cross point detection signal Zw on the basis of a detection result of a zero-cross point at which induced voltage appearing in the W-phase terminal voltage Vw intersects a zero-cross determination level, and generates the W-phase phase detection signal Hw having a phase delay of 30° with respect to the W-phase zero-cross point detection signal Zw.

The control unit 13 switches an energization pattern based on the phase detection signals Hu, Hv, and Hw, determines a switching duty ratio necessary for matching an actual rotation speed of the three-phase motor 20 with a target rotation speed, and performs switching control of each arm switch with the determined switching duty ratio. As a result, three-phase AC voltage that matches an actual rotation speed of the motor 20 with a target rotation speed is supplied from the drive circuit 11 to the three-phase motor 20.

The control unit 13 changes a value of a zero-cross determination level when induced voltage of at least one of three phases increases and decreases. For example, the control unit 13 changes a zero-cross determination level to a different value between when induced voltage of at least one phase increases and when the induced voltage decreases. More specifically, the control unit 13 changes a zero-cross determination level to a different value between when induced voltage of each of three phases increases and when the induced voltage decreases, and changes a zero-cross determination level to a different value for each phase.

Referring to FIG. 6, the control unit 13 changes a value of a zero-cross determination level from the ideal zero-cross determination level LV0 to the first U-phase zero-cross determination level LV1 in an energization period in which induced voltage appearing in the U-phase terminal voltage Vu decreases.

Further, the control unit 13 changes a value of a zero-cross determination level from the ideal zero-cross determination level LV0 to the first V-phase zero-cross determination level LV2 in an energization period in which induced voltage appearing in the V-phase terminal voltage Vv decreases.

Furthermore, the control unit 13 changes a value of a zero-cross determination level from the ideal zero-cross determination level LV0 to the first W-phase zero-cross determination level LV3 in an energization period in which induced voltage appearing in the W-phase terminal voltage Vw decreases.

Referring to FIG. 7, the control unit 13 changes a value of a zero-cross determination level from the ideal zero-cross determination level LV0 to the second U-phase zero-cross determination level LV1' in an energization period in which induced voltage appearing in the U-phase terminal voltage Vu increases.

Further, the control unit 13 changes a value of a zero-cross determination level from the ideal zero-cross determination level LV0 to the second V-phase zero-cross determination level LV2' in an energization period in which induced voltage appearing in the V-phase terminal voltage Vv increases.

Furthermore, the control unit 13 changes a value of a zero-cross determination level from the ideal zero-cross determination level LV0 to the second W-phase zero-cross determination level LV3' in an energization period in which induced voltage appearing in the W-phase terminal voltage Vw increases.

The storage unit 14 includes a nonvolatile memory that stores a program, various types of setting data, and the like necessary for causing the control unit 13 to execute various types of processing, and a volatile memory used as a temporary storage destination of data when the control unit 13 executes various types of processing. The nonvolatile memory is, for example, an electrically erasable programmable read-only memory (EEPROM), a flash memory, or the like. The volatile memory is, for example, a random access memory (RAM) or the like.

The storage unit 14 stores various types of data necessary for controlling the three-phase motor 20 by the sensorless 120° energization system. For example, the storage unit 14 stores in advance the energization pattern and the phase pattern illustrated in FIG. 2. Further, the storage unit 14 stores a value of the ideal zero-cross determination level LV0 in advance.

The storage unit 14 stores a first candidate value corresponding to a combination of decrease in induced voltage and a first phase of three phases. For example, the first candidate value is a value of the first U-phase zero-cross determination level LV1 corresponding to a combination of decrease in induced voltage and a U-phase.

The storage unit 14 stores a second candidate value corresponding to a combination of decrease in induced voltage and a second phase of three phases. For example, the second candidate value is a value of the first V-phase zero-cross determination level LV2 corresponding to a combination of decrease in induced voltage and a V-phase.

The storage unit 14 stores a third candidate value corresponding to a combination of decrease in induced voltage and a third phase of three phases. For example, the third candidate value is a value of the first W-phase zero-cross determination level LV3 corresponding to a combination of decrease in induced voltage and a W-phase.

The storage unit 14 stores a fourth candidate value corresponding to a combination of increase in induced voltage and a first phase of three phases. For example, the fourth candidate value is a value of the second U-phase zero-cross determination level LV1' corresponding to a combination of increase in induced voltage and a U-phase.

The storage unit 14 stores a fifth candidate value corresponding to a combination of increase in induced voltage and a second phase of three phases. For example, the fifth candidate value is a value of the second V-phase zero-cross determination level LV2' corresponding to a combination of increase in induced voltage and a V-phase.

The storage unit 14 stores a sixth candidate value corresponding to a combination of increase in induced voltage and a third phase of three phases. For example, the sixth candidate value is a value of the second W-phase zero-cross determination level LV3' corresponding to a combination of increase in induced voltage and a W-phase.

The control unit 13 reads, from the storage unit 14, a candidate value corresponding to one of the above six combinations from among the first candidate value to the sixth candidate value stored in the storage unit 14, and changes a value of a zero-cross determination level to the read candidate value.

Figure 8:
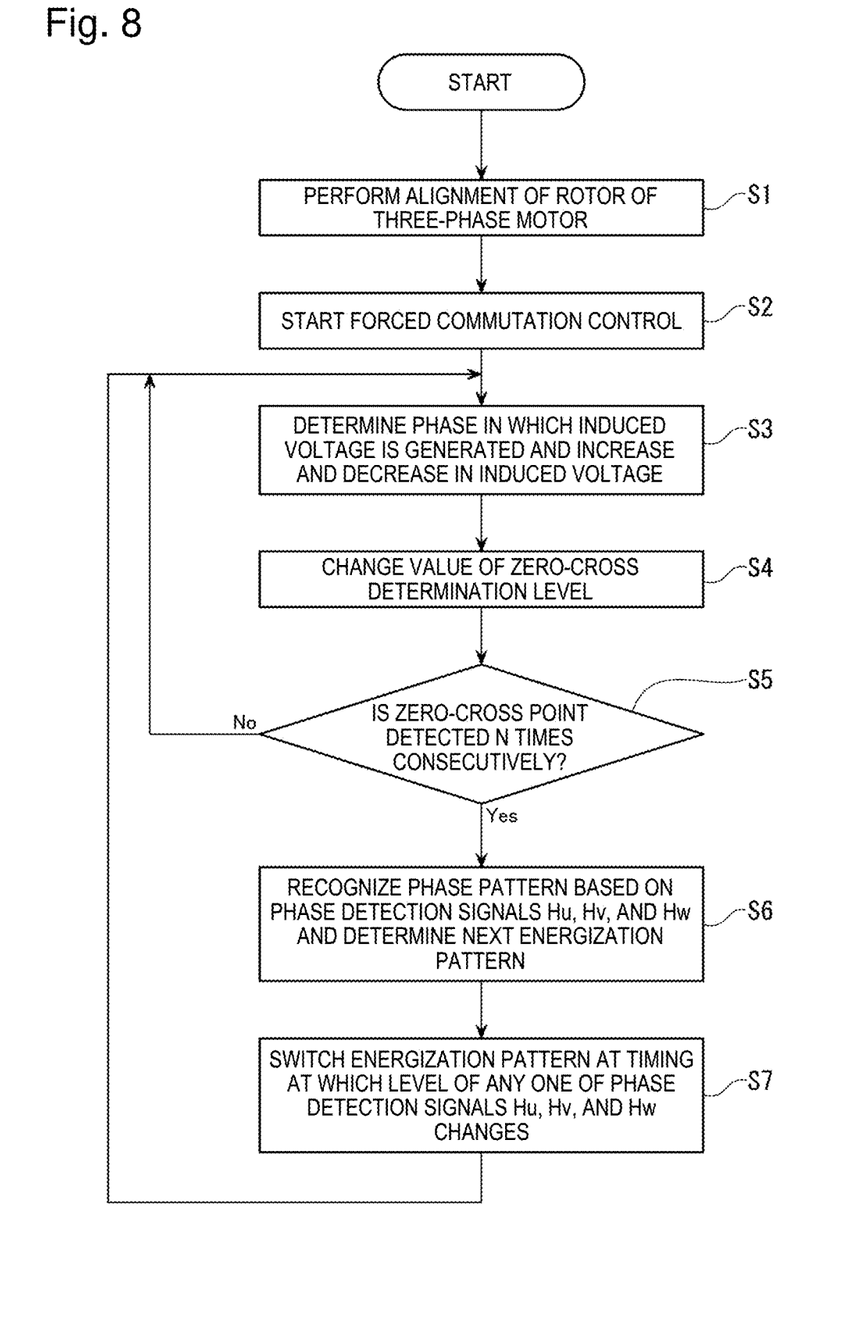
FIG. 8 is a flowchart illustrating each piece of processing included in extremely low speed rotation control of a three-phase motor 20 executed by a control unit 13 in a low temperature environment.

Next, the extremely low speed rotation control of the three-phase motor 20 executed by the control unit 13 under a low temperature environment will be described in detail with reference to FIG. 8. FIG. 8 is a flowchart illustrating each piece of processing included in the extremely low speed rotation control. In a case where a target rotation speed instructed by the rotation speed command signal CS is a rotation speed close to the limit minimum rotation speed, the control unit 13 starts the extremely low speed rotation control of the three-phase motor 20. As an example, a rotation speed close to the limit minimum rotation speed is 300 rpm to 600 rpm. Note that at the start of the extremely low speed rotation control, the three-phase motor 20 is in a stopped state.

As illustrated in FIG. 8, when starting the extremely low speed rotation control, the control unit 13 first performs alignment of the rotor of the three-phase motor 20 (Step S1), and starts forced commutation control of the three-phase motor 20 after completion of the alignment of the rotor (Step S2).

In a case where the three-phase motor 20 is started in the sensorless 120° energization system, until a rotation speed of the three-phase motor 20 reaches the limit minimum rotation speed at which induced voltage that allows detection of a zero-cross point is generated, the phase detection signals Hu, Hv, and Hw cannot be generated and the sensorless synchronization control of the three-phase motor 20 cannot be performed. For this reason, in a case where the three-phase motor 20 is started in the sensorless 120° energization system, it is necessary to perform energization control of the three-phase motor 20 according to a predetermined start sequence until a rotation speed of the three-phase motor 20 reaches the limit minimum rotation speed.

As an example of the start sequence, a start sequence in which, after a position of the rotor is aligned to a specific position (position corresponding to one of motor control states) by DC excitation performed on the three-phase motor 20 for a predetermined period of time, forced commutation control is performed to forcibly switch an energization phase (energization pattern) at a predetermined forced commutation frequency while predetermined drive voltage is applied to the energization phase is generally known. Since the processing in Steps S1 and S2 is included in the publicly-known start sequence as described above, detailed description of the processing will be omitted.

When the forced commutation control is started, a rotation speed of the three-phase motor 20 gradually increases toward a rotation speed corresponding to a forced commutation frequency. When the forced commutation control is started, the control unit 13 determines a phase in which induced voltage is generated in a current energization period, and determines whether the current energization period is a period in which induced voltage increases or decreases (Step S3). Then, the control unit 13 changes a value of a zero-cross determination level on the basis of a determination result obtained by execution of Step S3 (Step S4).

For example, in a case where a phase in which induced voltage is generated in a current energization period is a U phase and a current energization period is a period in which induced voltage decreases, the control unit 13 reads a first candidate value from the storage unit 14 and changes a value of a zero-cross determination level to the read first candidate value, that is, a value of the first U-phase zero-cross determination level LV1.

For example, in a case where a phase in which induced voltage is generated in a current energization period is a V phase and a current energization period is a period in which induced voltage decreases, the control unit 13 reads a second candidate value from the storage unit 14 and changes a value of a zero-cross determination level to the read second candidate value, that is, a value of the first V-phase zero-cross determination level LV2.

For example, in a case where a phase in which induced voltage is generated in a current energization period is a W phase and a current energization period is a period in which induced voltage decreases, the control unit 13 reads a third candidate value from the storage unit 14 and changes a value of a zero-cross determination level to the read third candidate value, that is, a value of the first W-phase zero-cross determination level LV3.

For example, in a case where a phase in which induced voltage is generated in a current energization period is a U phase and a current energization period is a period in which induced voltage increases, the control unit 13 reads a fourth candidate value from the storage unit 14 and changes a value of a zero-cross determination level to the read fourth candidate value, that is, a value of the second U-phase zero-cross determination level LV1'.

For example, in a case where a phase in which induced voltage is generated in a current energization period is a V phase and a current energization period is a period in which induced voltage increases, the control unit 13 reads a fifth candidate value from the storage unit 14 and changes a value of a zero-cross determination level to the read fifth candidate value, that is, a value of the second V-phase zero-cross determination level LV2'.

For example, in a case where a phase in which induced voltage is generated in a current energization period is a W phase and a current energization period is a period in which induced voltage increases, the control unit 13 reads a sixth candidate value from the storage unit 14 and changes a value of a zero-cross determination level to the read sixth candidate value, that is, a value of the second W-phase zero-cross determination level LV3'.

After changing a value of a zero-cross determination level as described above, the control unit 13 starts processing of detecting a point at which induced voltage appearing in the terminal voltages Vu, Vv, and Vw of each phase intersects a zero-cross determination level as a zero-cross point, and determines whether or not the zero-cross point is detected n times consecutively (Step S5). In the above, n is an integer of two or more.

Note that the control unit 13 starts processing of generating the zero-cross point detection signals Zu, Zv, and Zw of each phase based on a detection result for a zero-cross point of each phase, and processing of generating the phase detection signals Hu, Hv, and Hw of each phase based on the zero-cross point detection signals Zu, Zv, and Zw of each phase.

When a rotation speed of the three-phase motor 20 reaches the limit minimum rotation speed after start of the forced commutation control, relatively large induced voltage starts to appear in the terminal voltages Vu, Vv, and Vw of each phase, so that a zero-cross point starts to be detected. When it is determined in Step S5 that a zero-cross point is detected n times consecutively, it is estimated that the three-phase motor 20 starts to stably rotate at a rotation speed equal to or more than the limit minimum rotation speed.

In a case of "No" in Step S5, that is, in a case where the number of times of consecutive detection of a zero-cross point is less than n times, it is estimated that the three-phase motor 20 is yet to start to stably rotate at a rotation speed equal to or more than the limit minimum rotation speed. In this case, the control unit 13 returns to the processing of Step S3.

On the other hand, in a case of "Yes" in Step S5, that is, in a case where the number of times of consecutive detection of a zero-cross point reaches n times, it is estimated that the three-phase motor 20 starts to stably rotate at a rotation speed equal to or more than the limit minimum rotation speed. In this case, the control unit 13 recognizes a phase pattern of a current energization period based on the phase detection signals Hu, Hv, and Hw, and determines an energization pattern to be used in a next energization period based on the recognition result of a phase pattern (Step S6).

For example, as illustrated in FIG. 3, the number of times of consecutive detection of a zero-cross point is assumed to reach n when a zero-cross point at which induced voltage appearing in the V-phase terminal voltage Vv intersects a zero-cross determination level is detected in the energization period P1. Note that, in FIG. 3, a zero-cross determination level is set to the neutral point potential $V_N$ ($=V_M/2$), but a value of a zero-cross determination level in the energization period P1 is changed to a value of the first V-phase zero-cross determination level LV2 by the processing in Steps S3 and S4.

As described above, in a case where the number of times of consecutive detection of a zero-cross point reaches n in the energization period P1, the control unit 13 recognizes a phase pattern of the current energization period P1 based on the phase detection signals Hu, Hv, and Hw. In the energization period P1, the phase detection signals Hu and Hv are at a high level ("1"), and the phase detection signal Hw is at a low level ("0"). In this case, the control unit 13 recognizes that a phase pattern of the current energization period P1 is PB1 by referring to the phase pattern (see FIG. 2) stored in the storage unit 14.

Then, the control unit 13 determines an energization pattern to be used in a next energization period based on a recognition result of a phase pattern. For example, as described above, in a case of recognizing that a phase pattern of the current energization period P1 is PB1, the control unit 13 determines the energization pattern PA2 as an energization pattern to be used in a next energization period by referring to an energization pattern (see FIG. 2) stored in the storage unit 14.

After determining an energization pattern to be used in a next energization period, the control unit 13 switches an energization pattern to the energization pattern determined in Step S6 at a timing when a level of any one of the phase detection signals Hu, Hv, and Hw changes (Step S7). For example, in a case where the number of times of consecutive detection of a zero-cross point reaches n in the energization period P1 as described above, when the three-phase motor 20 rotates by 30° from a zero-cross detection timing based on induced voltage appearing in the V-phase terminal voltage Vv, a level of the phase detection signal Hv changes from a high level to a low level (see time t11 in FIG. 3). Therefore, in this case, the control unit 13 switches an energization pattern to the energization pattern PA2 determined in Step S6 at a timing (time t11) when a falling edge occurs in the phase detection signal Hv.

Note that the control unit 13 switches an energization pattern, determines a switching duty ratio necessary for matching an actual rotation speed of the three-phase motor 20 with a target rotation speed, and performs switching control of each arm switch with the determined switching duty ratio. For example, in a case where an energization pattern is switched to the energization pattern PA2 as described above, the control unit 13 controls the U-phase upper arm switch $Q_{UH}$ and the V-phase lower arm switch $Q_{VL}$ to be turned on, and controls the remaining arm switches to be turned off (see FIG. 2). In a case of the energization pattern PA2, the control unit 13 performs switching control with the determined switching duty ratio only for the U-phase upper arm switch $Q_{UH}$ (see FIG. 3). As a result, three-phase AC voltage that matches an actual rotation speed of the three-phase motor 20 with a target rotation speed is supplied from the drive circuit 11 to the three-phase motor 20.

After the above, the control unit 13 rotates the three-phase motor 20 at a target rotation speed by performing switching of an energization pattern and switching control of each arm switch at intervals of 60° in synchronization with the phase detection signals Hu, Hv, and Hw. As described above, in Step S6 and following steps, the control unit 13 starts the sensorless synchronization control for controlling the three-phase motor 20 in synchronization with the phase detection signals Hu, Hv, and Hw.

As described above, the motor control device 10 according to the present embodiment includes the control unit 13 that detects a point at which induced voltage appearing in each terminal voltage of three phases intersects a predetermined zero-cross determination level as a zero-cross point, and controls the drive circuit 11 based on a detection result of the zero-cross point. The control unit 13 changes a value of a zero-cross determination level when induced voltage of at least one phase among three phases increases and decreases.

In a case where the three-phase motor 20 is rotated at a rotation speed close to the limit minimum rotation speed under a low temperature environment, a zero-cross determination level deviates from an ideal value (½ of the DC power supply voltage $V_M$) between when induced voltage increases and when induced voltage decreases. For this reason, as in the present embodiment, as a value of a zero-cross determination level is changed between when induced voltage of at least one phase among three phases increases and when the induced voltage decreases, a zero-cross detection timing can be substantially matched with an ideal timing, and an energization pattern can be switched at intervals of 60° with high accuracy. Therefore, according to the present embodiment, the sensorless synchronization control of the three-phase motor 20 can be stably performed even in a case where the three-phase motor 20 is rotated at a rotation speed close to the limit minimum rotation speed under a low temperature environment.

Further, in the present embodiment, the control unit 13 changes a zero-cross determination level to a different value between when induced voltage of at least one phase increases and when the induced voltage decreases.

An amount by which a zero-cross determination level deviates from an ideal value is different between when induced voltage increases and when the induced voltage decreases. For this reason, as in the present embodiment, as a zero-cross determination level is changed to different values between when induced voltage increases and when the induced voltage decreases, a zero-cross detection timing can be substantially matched with an ideal timing each of when the induced voltage increases and when the induced voltage decreases, and an energization pattern can be switched at intervals of 60° more accurately.

Further, in the present embodiment, the control unit 13 changes a zero-cross determination level to a different value between when induced voltage of each of three phases increases and when the induced voltage decreases, and changes a zero-cross determination level to a different value for each phase.

An amount by which a zero-cross determination level deviates from an ideal value differs for each phase between when induced voltage increases and when the induced voltage decreases. For this reason, as in the present embodiment, not only a zero-cross determination level is changed to a different value between when induced voltage increases and when the induced voltage decreases, but also the zero-cross determination level is changed to a different value for each phase, so that a zero-cross detection timing can be substantially matched with an ideal timing for each phase, and an energization pattern can be switched at intervals of 60° more accurately.

Further, the motor control device 10 of the present embodiment includes the storage unit 14 that stores the first candidate value corresponding to a combination of increase in induced voltage and a first phase of three phases, the second candidate value corresponding to a combination of increase in induced voltage and a second phase of three phases, the third candidate value corresponding to a combination of increase in induced voltage and a third phase of three phases, the fourth candidate value corresponding to a combination of decrease in induced voltage and the first phase, the fifth candidate value corresponding to a combination of decrease in induced voltage and the second phase, and the sixth candidate value corresponding to a combination of decrease in induced voltage and the third phase. The control unit 13 reads a candidate value corresponding to one of six combinations from the first candidate value to the sixth candidate value from the storage unit 14, and changes a value of a zero-cross determination level to the read candidate value.

According to the present embodiment, a value of a zero-cross determination level can be changed by simple processing. Since a value of a zero-cross determination level can be changed by simple processing, a processing load on the control unit 13 can be reduced.

The present invention is not limited to the above embodiment, and the configurations described in the present description can be appropriately combined within a range not conflicting with one another.

In the above embodiment, as an electric pump device of the present invention, the electric pump device 100 that supplies the cooling oil F to a driving motor mounted on a hybrid vehicle is exemplified. However, the electric pump device of the present invention is not limited to this, and the present invention can also be applied to, for example, an electric pump device that supplies oil to a transmission. Further, fluid discharged from the electric pump is not limited to oil such as cooling oil. Further, the motor control device of the present invention may be used as a control device that controls a three-phase motor mounted on a device other than an electric pump device.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor control device that controls a three-phase motor, the motor control device comprising:
   a drive circuit that converts DC power supply voltage into three-phase AC voltage and supplies the three-phase AC voltage to the three-phase motor;
   a voltage detection unit that detects terminal voltage of three phases of the three-phase motor; and
   a control unit that detects a point at which induced voltage appearing in each terminal voltage of the three phases intersects a predetermined zero-cross determination level as a zero-cross point, and controls the drive circuit based on a detection result of the zero-cross point,
   wherein the control unit changes a value of the zero-cross determination level when the induced voltage of at least one of the three phases increases and when the induced voltage of at least one of the three phases decreases.

2. The motor control device according to claim 1, wherein the control unit changes the zero-cross determination level to a different value between when the induced voltage of the at least one phase increases and when the induced voltage of the at least one phase decreases.

3. The motor control device according to claim 2, wherein the control unit changes the zero-cross determination level to a different value between when the induced voltage of each of the three phases increases and when the induced voltage of each of the three phases decreases, and changes the zero-cross determination level to a different value for each of the phases.

4. The motor control device according to claim 3, further comprising:
a storage unit that stores a first candidate value corresponding to a combination of decrease in the induced voltage and a first phase of the three phases, a second candidate value corresponding to a combination of decrease in the induced voltage and a second phase of the three phases, a third candidate value corresponding to a combination of decrease in the induced voltage and a third phase of the three phases, a fourth candidate value corresponding to a combination of increase in the induced voltage and the first phase, a fifth candidate value corresponding to a combination of increase in the induced voltage and the second phase, and a sixth candidate value corresponding to a combination of increase in the induced voltage and the third phase,
wherein the control unit reads a candidate value corresponding to one of six of the combinations from the first candidate value to the sixth candidate value from the storage unit, and changes a value of the zero-cross determination level to the read candidate value.

5. An electric pump device comprising:
a three-phase motor having a shaft;
a pump located on a first side in an axial direction of the shaft and driven by the three-phase motor via the shaft; and
the motor control device according to claim 1 that controls the three-phase motor.

* * * * *